United States Patent [19]

Yamanaka

[11] Patent Number: 4,619,154
[45] Date of Patent: Oct. 28, 1986

[54] CHOKE LEVER DEVICE FOR A MOTOR VEHICLE

[75] Inventor: Isao Yamanaka, Saitama, Japan

[73] Assignee: Honda Giken Kogyo K.K., Tokyo, Japan

[21] Appl. No.: 735,517

[22] Filed: May 20, 1985

Related U.S. Application Data

[63] Continuation of Ser. No. 419,277, Sep. 17, 1982, Pat. No. 4,526,056.

[30] Foreign Application Priority Data

Sep. 19, 1981 [JP] Japan .................. 56-148147

[51] Int. Cl.⁴ .................................. G05G 13/00
[52] U.S. Cl. .................................. 74/489; 74/506; 192/0.096; 192/99 S; 200/61.85; 200/157
[58] Field of Search ............ 74/488, 489, 506; 180/219; 192/0.096, 99 S

[56] References Cited

U.S. PATENT DOCUMENTS

| | | | |
|---|---|---|---|
| 3,935,916 | 2/1976 | Ferraro | 180/219 |
| 4,275,280 | 6/1981 | Yamazaki | 200/61.85 |
| 4,291,590 | 9/1981 | Mizusaki | 74/551.8 |
| 4,319,673 | 3/1982 | Kojima | 74/489 X |

FOREIGN PATENT DOCUMENTS

| | | | |
|---|---|---|---|
| 113856 | 7/1929 | Fed. Rep. of Germany | 74/489 |
| 2530745 | 1/1977 | Fed. Rep. of Germany | 180/219 |
| 436262 | 6/1948 | Italy | 74/489 |
| 297650 | 6/1954 | Switzerland | 74/489 |
| 203926 | 9/1923 | United Kingdom | 74/489 |
| 356337 | 9/1931 | United Kingdom | 74/489 |
| 862475 | 3/1961 | United Kingdom | 74/489 |

Primary Examiner—Allan D. Herrmann
Attorney, Agent, or Firm—Sughrue, Mion, Zinn Macpeak & Seas

[57] ABSTRACT

A choke lever device for a two-wheeled motor vehicle wherein choke adjustment is effected through a wire by a choke lever mounted on a handle part. The choke lever is mounted rotatably around a handle pipe serving as a center axis.

4 Claims, 10 Drawing Figures

CHOKE LEVER DEVICE FOR A MOTOR VEHICLE

RELATED APPLICATIONS

This application is a continuation of application Ser. No. 419,277, filed Sept. 17, 1982 now U.S. Pat. No. 4,526,056.

DESCRIPTION OF THE INVENTION

The present invention relates to a choke lever device for a two-wheeled motor vehicle. Generally, in a choke for a two-wheeled motor vehicle, a lever is provided on a handle part and the choke adjustment can be effected by manual engagement through a wire for improving the operational efficiency of the engine.

SUMMARY OF THE INVENTION

It is an object of this invention to provide for an improved choke assembly for a two-wheeled vehicle.

It is another object of this invention to provide a choke lever assembly for a two-wheeled vehicle that is efficient to operate and adjustably mounted on the vehicle handle.

The present invention is directed toward providing a choke lever device for a two-wheeled motor vehicle capable of especially improving its operational efficiency. By mounting a choke lever on a handle part such that the choke lever is rotatable around a handle pipe serving as a center axis, efficiency and ease of operation are attained.

The present invention will now be described in detail on one embodiment thereof referring to the accompanying drawings and the description of the preferred embodiment that follows.

DESCRIPTION OF THE PREFERRED EMBODIMENT

Figure 1:
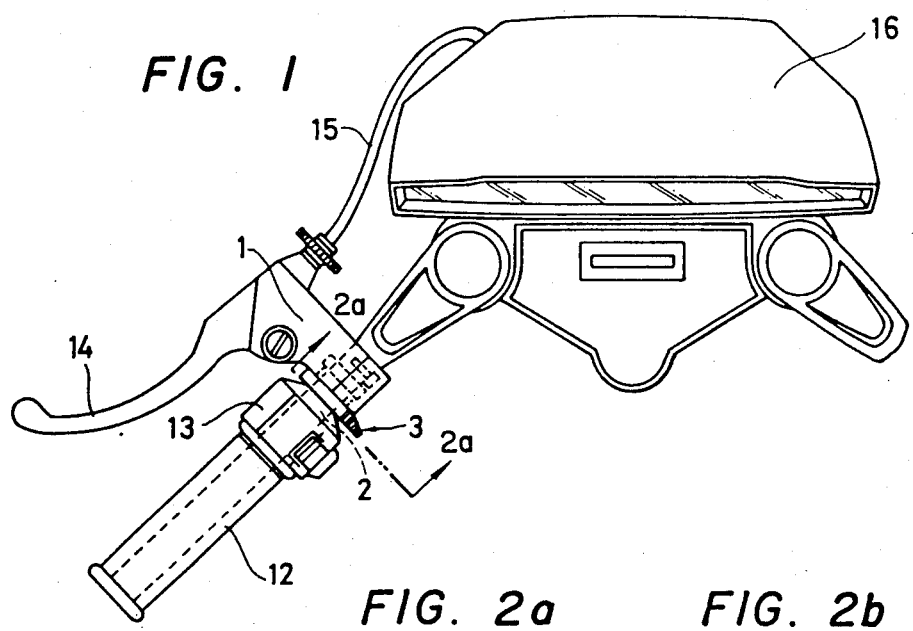
FIG. 1 is a plan view showing a construction of the handle part of a two-wheeled motor vehicle provided with a choke lever device according to one embodiment of the present invention.

In a choke lever device for a two-wheeled motor vehicle according to the present invention, a choke lever 3 is mounted, as shown in FIG. 1, on a handle pipe 2 by utilizing a clutch lever bracket 1 mounted on the handle. The choke lever is rotatable around the pipe which serves as its center axis.

Figure 2A:
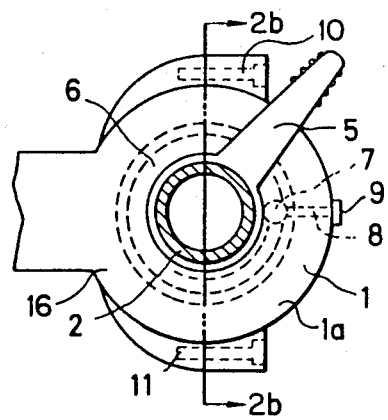
FIG. 2(a) is a sectional view taken along the line 2a—2a of FIG. 1.
Figure 2B:
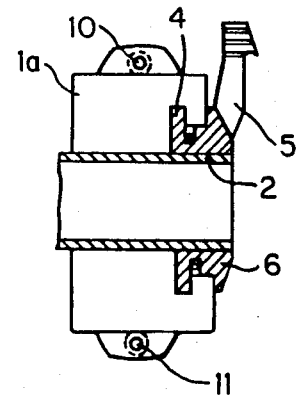
FIG. 2(b) is a sectional view taken along the line 2b—2b of FIG. 2(a)

Specifically, as shown in FIGS. 2(a) and 2(b), the choke lever 3 is constructed to form a lever part 5 protruding on a ring-shaped member having, at the center thereof, a penetrating opening through which the handle pipe 2 penetrates. The choke lever is also provided with an engaging part 6 for attaching the choke lever 3 to the clutch lever bracket 1 by engaging the part 6 with a recess formed in the bracket 1. A protrusion 4 is formed on the engaging ring 6 to restrict the lateral movement thereof in the recess. Further, within the engaging ring 6, a pin 7 is embedded for supporting a wire linked to the choke of a carburetor. The wire can be drawn to the outside through a hole 8 penetrating on the clutch lever bracket 1. In FIG. 2(a), numeral 9 designates a wire outlet provided on the clutch lever bracket 1. Further, the clutch lever bracket 1 can be divided into two pieces, 1a and 1b, both of which are clamped together on the handle pipe 2, by tightening bolts 10 and 11 at the upper and lower portions thereof. In FIG. 1, numeral 12 designates a handle grip; 13 a bracket for light control switches; 14 a clutch lever; 15 a clutch wire; and 16 a speedometer box, respectively. These elements are arranged on the vehicle handles in a manner shown in FIG. 1.

In the choke lever device thus constructed according to the present invention, fine adjustment of the choke can be effectuated easily since a large operational angle can be allowed due to the fact that the lever operation is performed by rotating the lever part 5 in a circumferential direction with the handle pipe 2 as its center axis. Also, since the choke lever is provided close to the handle grip 12, the rotating operation of the lever part 5 can be performed easily by the thumb finger of a driver with his hands still gripping the handle grip.

Further, although the choke lever is mounted in the above-mentioned embodiment by utilizing the clutch lever bracket, the choke lever may be mounted to be rotatable around the handle pipe serving as the center by utilizing a clutch master cylinder and a master cylinder holder.

Figure 3A:
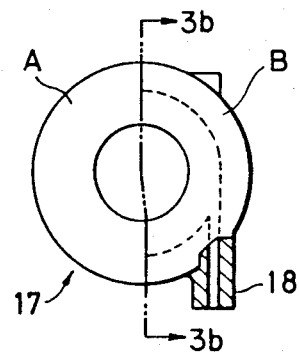
FIG. 3(a) is a front view showing an exclusive choke lever bracket.
Figure 3B:
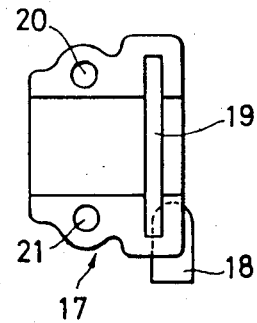
FIG. 3(b) is a sectional view taken along the line 3b—3b of FIG. 3(a)

Further, by utilizing an exclusive two-piece choke lever holder 17 as shown in FIG. 3(a) or 3(b), a choke lever (not specifically shown) may be mounted separately on a portion of the handle pipe 2 close to the handle grip 12 such as on a portion between the clutch lever bracket 1 and the bracket 13 for light control switches in FIG. 1. Further, in FIG. 3(b), numeral 18 designates a wire outlet; 19 a recess to be engaged with the engaging part formed in the choke lever; and 20, 21 designate bolt holes for clamping the two-piece holder A, B together at its upper and lower portions to secure it to the handle grip 12, respectively.

Figure 4:
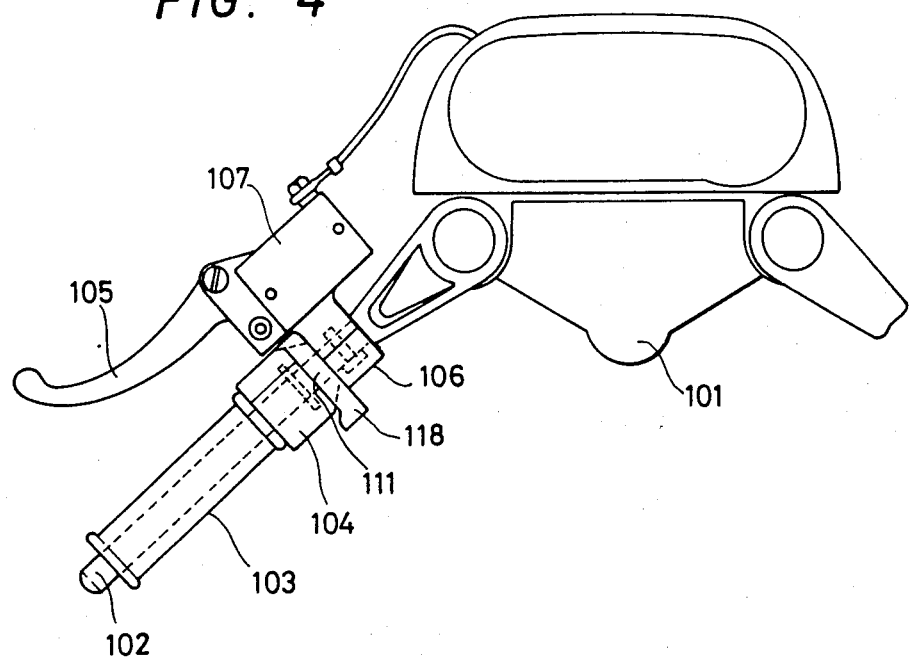
FIG. 4 is a plan view showing a handle part of a two-wheeled motor vehicle.
Figure 5:
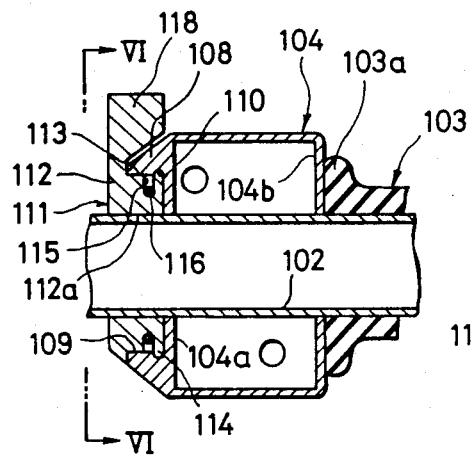
FIG. 5 is an enlarged transverse sectional view of a choke lever part.
Figure 6:
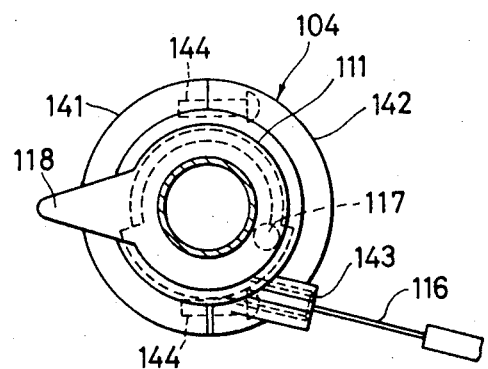
FIG. 6 is a diagram taken along the line VI—VI of FIG. 5.

A second embodiment will now be described. FIG. 4 is a plan view showing a handle part of a two-wheeled motor vehicle; FIG. 5 is an enlarged transverse sectional view of a choke lever part; and FIG. 6 is a diagram taken along the line VI—VI of FIG. 5.

Numeral 101 designates a top bridge coupled with the upper ends of left and right fork pipes of a front fork for supporting a conventional front wheel. The top bridge 101 is pivotally mounted on a head tube at the body side by a steering stem. There is illustrated in this embodiment a separate type wherein the left and right handle pipes 102 are divided. The bases of the handle pipes 102 (only one shown in the figure) are coupled to a top bridge, a single-bar handle may also be used.

The right-hand handle pipes, not shown, is conventional. That is, it includes a rotatable handle grip which controls the throttle in a conventional manner.

At the outer periphery of the illustrated handle pipe 102, a fixed grip 103 is provided at the downstream part near the remote end, and at the upstream side of the handle pipe, adjacent to grip 103, a handle switch housing 104 is provided. Just upstream of the switch housing 104, a holder 106 for a clutch lever 105 is provided. Since the clutch lever is of an oil pressure type in the present embodiment, the holder 106 is provided with a clutch master cylinder 107 to which the clutch lever 105 is swingably mounted through the holder 106.

On the handle switch housing 104, there are provided a horn switch, a head lamp switch, a high-low beam changeover switch and so forth. The housing 104 is generally formed by two pieces 141 and 142 having dividing surfaces in the radial direction of the handle pipe. Both of these pieces are fastened together by screws 144, 144 penetrating therethrough, to hold the handle pipe 102. The housing 104 is provided with end walls 104a, 104b in a line in the longitudinal direction of the pipe 102, with the outer end (rear end) wall 104b abutting on an upstream end flange portion 103a of the downstream side grip 103. At the periphery of the inner end (front end) wall 104a, a projecting frame 108 is provided toward the upstream direction. The projecting frame has a bore portion 109 of a predetermined length in the longitudinal direction, open in the upstream direction, while closed in the downstream direction. At the downstream end of the bore portion 109, there is provided a larger diameter annular hollow portion 110 having the wall 104a at its downstream end.

Numeral 111 designates a choke lever engaging at a bore portion 112a of the base 112 thereof rotatably with the outer peiphery of the pipe 102. The base 112 has a boss part 113 engaging the bore portion of the aforesaid projecting frame 108. At the downstream end thereof, an annular engaging flange 114 is provided for engagement with the larger diameter hollow portion 110, and the boss part 113 is engaged with the bore portion 109 as the two pieces 141, 142 are joined together to engage the hollow portion 110 with the flange portion 114. Consequently, the longitudinal movement of the lever 111 is restricted by the engagement of the portions 114, 110. At the upstream side of the flange portion 114, an annular hollow portion 115 is provided with a choke cable 116 wound around. The end thereof is coupled to the lever 111 side with a drum 117, and the cable 116 is led out from a guide part 143 formed on one member 142 of the housing 104 to be connected with the choke valve lever of the carburetor. A lever portion 118 extends externally from a part of the base 112 to project from the outer periphery of the housing 104. As shown, the lever 111 mounted at the upstream side of the housing 104 is integral therewith.

As mentioned herein, the choke lever is mounted at the upstream side of the switch housing to be integral therewith, and the lever portion 118 is provided to protrude at the outer periphery of the upstream of the switch housing 104. Consequently, the choke operation is effectuated by pressing the lever with a finger to rotate it around the pipe 102. Therefore, the operational efficiency is improved since the choke operation can be done at the same position as the switching operation while the grip is being grasped. Further, since the lever is constructed to rotate around the handle pipe 102, no additional pivotal fulcrum is needed.

Since the choke lever is on the opposite side from the throttle, the choke and throttle can be operated simultaneously, but independently. Further, since the radius of the lever 118, where it will be pressed by the operator, is greater than the radius of the pipe, about which the choke wire 116 is wound, the movements of the lever effect relatively small movement of the wire 116, thereby allowing fine adjustment of the choke.

Further, the choke lever 111 can be assembled when the switch housing is assembled to the pipe 102, and thus no additional hardware for securing the choke lever itself is needed. The reduction of the number of parts and the assembly steps thereof can be attained. The choke lever for appearance sake is integral with the switch housing and the bolts and the like of the choke lever itself will not be visible, thereby the external appearance can be streamlined and improved.

Figure 7:
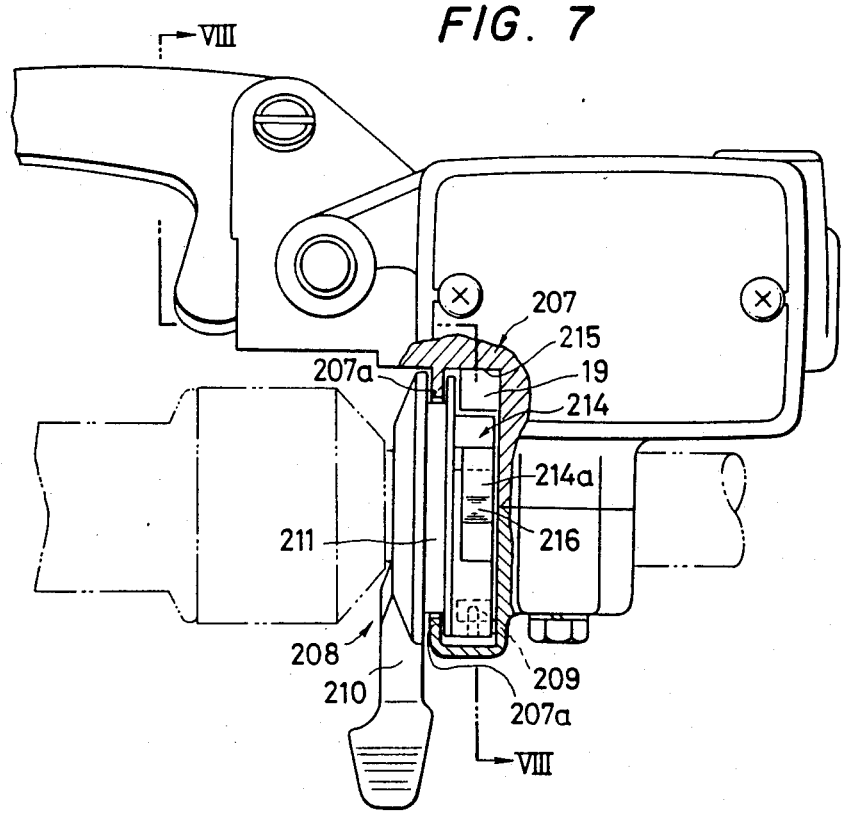
FIG. 7 is a plan view showing a choke lever device according to another embodiment of the present invention.
Figure 8:
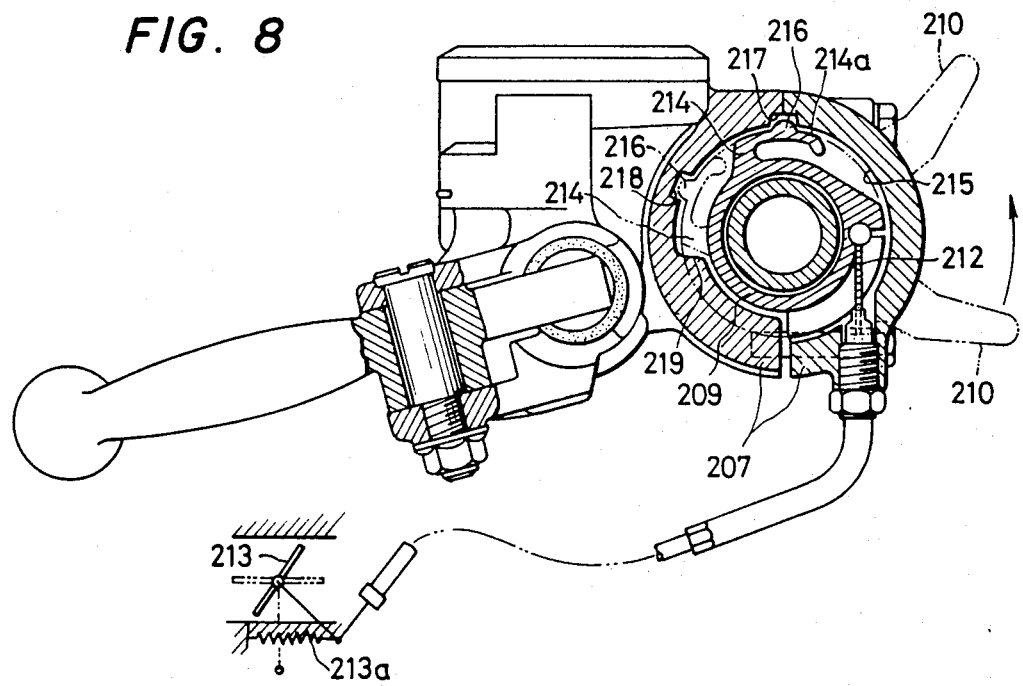
FIG. 8 is a sectional view taken along the line VIII—VIII of FIG. 7.

A third embodiment will now be described with reference to FIGS. 7 and 8. An operating member 208 which is rotatably provided in a holder 207 comprises a rotating member 209 rotatably mounted on a handle lever 202 and provided within the holder 207, and a lever member 210 integral with the rotating member 209 through a shaft 211 and provided outside the holder.

The shaft 211 is rotatably inserted into an outer wall 207a of the holder. When the lever 210 is turned in the direction of the arrow shown in FIG. 8, a choke wire 212 connected to the rotating member 209 is wound up to thereby operate a choke valve 213. Reference numeral 213a designates a return spring 213 for the choke valve.

An elastic arm 214 is provided integrally with an outer periphery of the rotating member 209. The elastic arm 214 is integrally provided with a portion 214a extending to face an inner peripheral wall 215 of the holder 207 and an elastic protrusion 216 on the portion 214a. The elastic protrusion 216 is adapted to engage grooves 217 and 218 which are provided at predetermined positions on the inner peripheral wall 215 of the holder 207, for example, at a fully-opened position of the choke valve and a fully-closed position thereof. Further, a stepped portion 219 is provided on the inner peripheral wall 215 as a stopper which prevents excessive rotation of the operating member 208.

When the lever 210 is turned in the direction of the arrow, the rotating member 209 formed integrally with the lever is then rotated. Accordingly, the elastic member 216 of the elastic arm 214 of the rotating member 209 moves out of the first groove 217 provided on the inner peripheral wall 215 of the holder 7, and slides over the inner peripheral wall 215 and finally engages the second groove 218 and stops. When the lever is further turned in the same direction, the elastic arm 214 contacts the stopper 219 and is stopped. Thus, excess rotation of the operating member 208 can be prevented.

As described herein, the choke lever device for a two-wheeled motor vehicle according to the present invention of the type wherein the choke adjustment is effectuated through a wire by a choke lever mounted on the handle part. Mounting the choke lever is rotatably accomplished around the handle pipe serving as its center, and therefore it is possible to efficiently mount the choke lever by utilizing for instance the clutch lever bracket fitted on the handle part. Also, there is an added advantage in that good operational efficiency is obtained since the choke lever can be disposed close to the handle grip.

It is apparent that other modifications of this invention may be practiced without departing from the essential scope thereof.

What is claimed:

1. A choke adjustment lever device for a motor vehicle having a handle pipe, the improvement comprising,
    a fixed handle grip fixed on said handle pipe near one end thereof,
    an adjustable choke assembly having a choke lever and rotatably mounted on said handle pipe upstream of said fixed grip sufficiently near said fixed grip to permit operator thumb engagement with said choke lever while grasping said fixed grip as a fixed pivot point, wherein an adjusting amount of said choke lever increases by rotating said choke lever about said handle grip,
    a switch housing mounted on said handle pipe between the upstream end of said fixed grip and said adjustable choke assembly,
    and a lever positioned near said handle grip.

2. A choke adjustment lever device as claimed in claim 1,
    the downstream end of said switch housing abutting the upstream end of said fixed grip; and the upstream end of said switch housing engaging said adjustable choke assembly to prevent lateral movement and permit rotatable movement of said choke assembly.

3. A choke adjustment lever device as claimed in claim 2, further comprising an annular projecting frame on said switch housing, said projecting frame having a bore coaxial with said handle pipe, said bore terminating at an outer wall of said switch housing, an annular hollow portion in said bore,
    said choke lever further comprising a base portion rotatably mounted on said pipe, said base portion having a boss extending within said bore, said boss having annular engaging flange thereon rotatably fitting in said annular hollow position of said bore, and a hand control lever extending from said base portion outside said bore,
    said boss further having an annular hollow portion, and a choke wire fixed at one end in said annular hollow portion and extending out through said switch housing.

4. A choke adjustment lever device as claimed in claim 3, further comprising a clutch lever holder disposed upstream of said choke lever, and a clutch mastercylinder, said clutch master cylinder connecting said clutch lever to said clutch lever holder, said choke lever being connected to said clutch lever holder.

* * * * *